(12) United States Patent
Tsai et al.

(10) Patent No.: US 11,910,247 B2
(45) Date of Patent: Feb. 20, 2024

(54) METHOD AND DEVICE FOR SWITCHING BETWEEN DIFFERENT RADIO ACCESS TECHNOLOGIES

(71) Applicant: MEDIATEK INC., Hsinchu (TW)

(72) Inventors: Chih-Yuan Tsai, Hsinchu (TW); Tsung-Ming Lee, Hsinchu (TW); Ho-Wen Pu, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 106 days.

(21) Appl. No.: 17/466,076

(22) Filed: Sep. 3, 2021

(65) Prior Publication Data

US 2022/0110026 A1  Apr. 7, 2022

Related U.S. Application Data

(60) Provisional application No. 63/087,928, filed on Oct. 6, 2020.

(51) Int. Cl.
*H04W 36/00* (2009.01)
*H04W 36/30* (2009.01)
(Continued)

(52) U.S. Cl.
CPC ... *H04W 36/0022* (2013.01); *H04W 36/0058* (2018.08); *H04W 36/00837* (2018.08);
(Continued)

(58) Field of Classification Search
CPC ......... H04W 36/0011; H04W 36/0016; H04W 36/0022; H04W 36/0058; H04W 36/0083;
(Continued)

(56) References Cited

U.S. PATENT DOCUMENTS

2007/0002795 A1\* 1/2007 Bi .................. H04W 28/22
370/329
2014/0247742 A1 9/2014 Lee et al.
(Continued)

FOREIGN PATENT DOCUMENTS

WO  2020/034327 A1  2/2020
WO  2020/167209 A1  8/2020

OTHER PUBLICATIONS

Chinese language office action dated Feb. 23, 2022, issued in application No. TW 110136131.

*Primary Examiner* — Matthew W Genack
(74) *Attorney, Agent, or Firm* — McClure, Qualey & Rodack, LLP (57) ABSTRACT

A method for switching between different RATs is provided. The method is executed by a mobile communications device camping on a first cell using a first Radio Access Technology (RAT). The method includes: determining, by a controller of the mobile communications device, a data transmission rate of the mobile communications device in the first cell; sending, by the controller, a first measurement report according to the determined data transmission rate, wherein the first measurement report is intended to trigger a handover procedure initiated by the first cell or to release a radio resource control (RRC) connection; and switching, by the controller, to camp on a second cell using a second RAT via the handover procedure or a local releasing procedure after the sending of the first measurement report.

16 Claims, 9 Drawing Sheets

(51) Int. Cl.
   *H04W 76/30* (2018.01)
   *H04W 84/04* (2009.01)
(52) U.S. Cl.
   CPC ........... *H04W 36/30* (2013.01); *H04W 76/30* (2018.02); *H04W 84/042* (2013.01)
(58) Field of Classification Search
   CPC ....... H04W 36/00837; H04W 36/0085; H04W 36/0088; H04W 36/0094; H04W 36/24; H04W 36/30; H04W 76/00; H04W 76/30
   See application file for complete search history.

(56) References Cited

U.S. PATENT DOCUMENTS

| | | | |
|---|---|---|---|
| 2016/0128004 A1 | 5/2016 | Lee et al. | |
| 2016/0150441 A1* | 5/2016 | Gunnarsson | H04W 36/22 455/443 |
| 2018/0192337 A1 | 7/2018 | Ryu et al. | |
| 2019/0090181 A1 | 3/2019 | Iyer et al. | |
| 2019/0253944 A1* | 8/2019 | Kim | H04W 36/08 |
| 2019/0349822 A1 | 11/2019 | Kim et al. | |

* cited by examiner

METHOD AND DEVICE FOR SWITCHING BETWEEN DIFFERENT RADIO ACCESS TECHNOLOGIES

CROSS REFERENCE TO RELATED APPLICATIONS

This application claims priority under 35 U.S.C. § 119 from U.S. Provisional Application No. 63/087,928, entitled "Smart Switch for SA 4/5G switch," filed on Oct. 6, 2020, the subject matter of which is incorporated herein by reference.

BACKGROUND OF THE APPLICATION

Field of the Application

The present disclosure generally relates to the field of wireless communication technology. More specifically, aspects of the present disclosure relate to a method and device for switching between different radio access technologies (RATs).

Description of the Related Art

In a typical mobile communication environment, a User Equipment (UE) (also called a Mobile Station (MS)), such as a mobile telephone (also known as a cellular or cell phone), or a tablet Personal Computer (PC) with wireless communication capability may communicate voice and/or data signals with one or more mobile communication networks. The wireless communication between the UE and the mobile communication networks may be performed using various Radio Access Technologies (RATs), such as Global System for Mobile communications (GSM) technology, General Packet Radio Service (GPRS) technology, Enhanced Data rates for Global Evolution (EDGE) technology, Wideband Code Division Multiple Access (WCDMA) technology, Code Division Multiple Access 2000 (CDMA-2000) technology, Time Division-Synchronous Code Division Multiple Access (TD-SCDMA) technology, Worldwide Interoperability for Microwave Access (WiMAX) technology, Long Term Evolution (LTE) technology, and LTE-Advanced (LTE-A) technology, etc. In particular, GSM/GPRS/EDGE technology is also called 2G technology; WCDMA/CDMA-2000/TD-SCDMA technology is also called 3G technology; and LTE/LTE-A/TD-LTE technology is also called 4G technology.

These RAT technologies have been adopted for use in various telecommunication standards to provide a common protocol that enables different mobile communications devices to communicate on a municipal, national, regional, and even global level. An example of an emerging telecommunication standard is the 5G New Radio (NR). The 5G NR is a set of enhancements to the LTE mobile standard promulgated by the Third Generation Partnership Project (3GPP). It is designed to better support mobile broadband Internet access by improving spectral efficiency, reducing costs, and improving services.

However, the power consumption (130.3 mA) of the UE connected to a 5G network and in an idle state is nearly three times higher than the power consumption (44.1 mA) of the UE connected to a 4G network and in an idle state. When the signal quality of the UE connected to the 5G network becomes poor, the power consumption may increase. In addition, when the data transmission rate of the UE is lower than a threshold (e.g., 30 mbps), the power efficiency of the UE connected to the 4G network may be better than that connected to the 5G network.

Therefore, there is a need for a method and device for switching between different RATs to effectively reduce the power consumption of the UE.

SUMMARY

The following summary is illustrative only and is not intended to be limiting in any way. That is, the following summary is provided to introduce concepts, highlights, benefits and advantages of the novel and non-obvious techniques described herein. Select, not all, implementations are described further in the detailed description below. Thus, the following summary is not intended to identify essential features of the claimed subject matter, nor is it intended for use in determining the scope of the claimed subject matter.

Therefore, the main purpose of the present disclosure is to provide a method and device for switching between different RATs to overcome the above disadvantages.

In an exemplary embodiment, a method, executed by a mobile communications device camping on a first cell using a first Radio Access Technology (RAT), the method comprising: determining, by a controller of the mobile communications device, a data transmission rate of the mobile communications device in the first cell; sending, by the controller, a first measurement report according to the determined data transmission rate, wherein the first measurement report is intended to trigger a handover procedure initiated by the first cell or to release a radio resource control (RRC) connection; and switching, by the controller, to camp on a second cell using a second RAT via the handover procedure or a local releasing procedure after the sending of the first measurement report.

In some embodiments, the first RAT is fifth generation (5G) New Radio (NR), the second RAT is fourth generation (4G) Long Term Evolution (LTE), and the sending of the first measurement report comprises sending the first measurement report in response to the determined data transmission rate being lower than a threshold.

In some embodiments, the first RAT is 4G LTE, the second RAT is 5G NR, and the sending of the first measurement report comprises sending the first measurement report in response to the determined data transmission rate being higher than a threshold.

In some embodiments, the first measurement report comprises a parameter indicating that a signal quality between the mobile communications device and the first cell is too poor to maintain a connection between the mobile communications device and the first cell.

In some embodiments, the signal quality comprises a reference signal received power (RSRP) and a reference signal received quality (RSRQ).

In some embodiments, the first measurement report is sent when a measurement of the second cell is configured by the first cell.

In some embodiments, the method further comprises: sending a second measurement report intended to trigger a measurement control procedure to measure the second cell when the measurement is not configured by the first cell.

In some embodiments, the method further comprises: receiving a radio resource control (RRC) connection release message sent by the first cell when releasing the RRC connection.

In some embodiments, the local releasing procedure comprises releasing a connection between the mobile communications device and the first cell in response to the handover procedure not being triggered for a period of time after the sending of the first measurement report.

In some embodiments, the local releasing procedure further comprises obtaining information related to the second cell according to a public land mobile network (PLMN) list from the first cell.

In an exemplary embodiment, a mobile communications device, comprising: a wireless transceiver, configured to perform wireless transmission and reception utilizing a first Radio Access Technology (RAT); and a controller, coupled to the wireless transceiver, and configured to: determine a data transmission rate of the mobile communications device camping on a first cell; send a first measurement report according to the determined data transmission rate, wherein the first measurement report is intended to trigger a handover procedure initiated by the first cell or to release a radio resource control (RRC) connection; and switch to camp on a second cell using a second RAT via the handover procedure or a local releasing procedure after sending the first measurement report.

BRIEF DESCRIPTION OF DRAWINGS

The application can be more fully understood by reading the subsequent detailed description and examples with references made to the accompanying drawings, wherein.

DETAILED DESCRIPTION

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using number of the aspects set forth herein. In addition, the scope of the disclosure is intended to cover such an apparatus or method which is practiced using another structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects. Furthermore, like numerals refer to like elements throughout the several views, and the articles "a" and "the" includes plural references, unless otherwise specified in the description.

It should be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion. (e.g., "between" versus "directly between", "adjacent" versus "directly adjacent", etc.).

Figure 1:
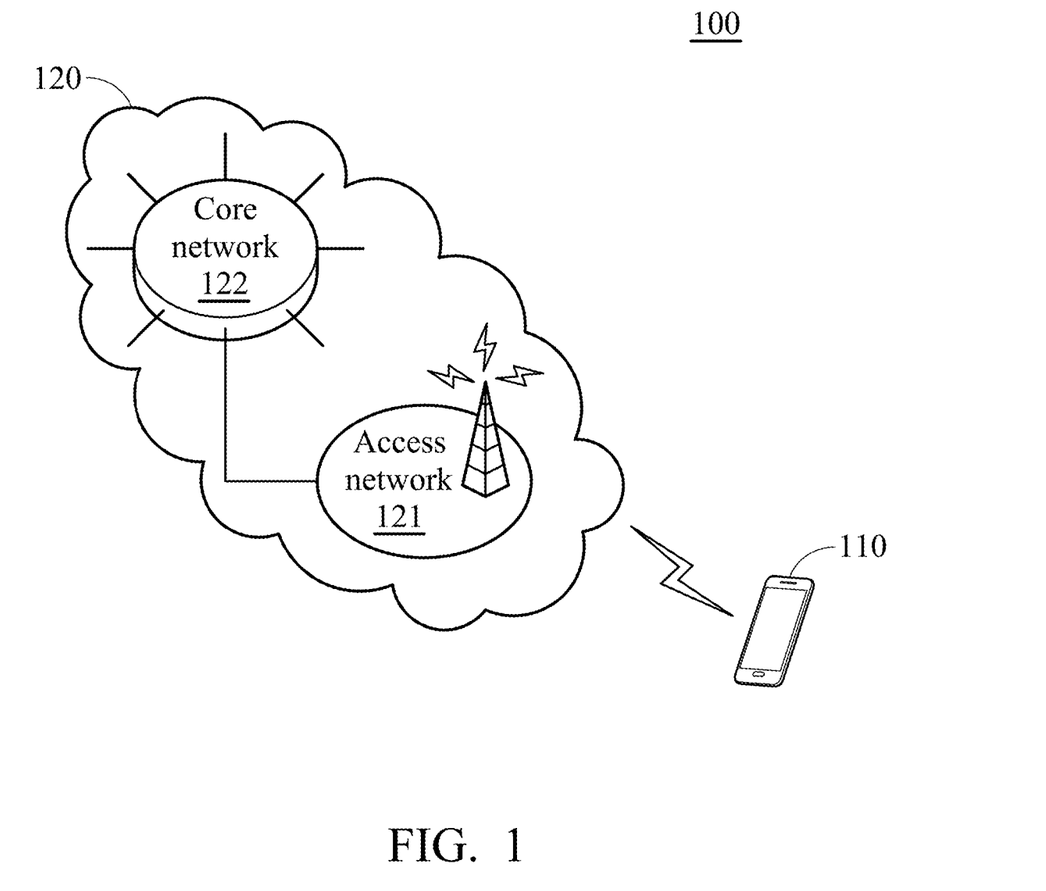
FIG. 1 is a block diagram of a mobile communication environment according to an embodiment of the disclosure.

FIG. 1 is a block diagram of a mobile communication environment according to an embodiment of the disclosure.

As shown in FIG. 1, the mobile communication environment 100 includes a UE 110 and a mobile communication network 120.

The UE 110 may be a feature phone, a smartphone, a panel Personal Computer (PC), a laptop computer, a Machine Type Communication (MTC) device, or any mobile communication device supporting the RAT utilized by the mobile communication network 120. The UE 110 may connect to the mobile communication network 120 to obtain mobile services (e.g., voice and/or data services).

The mobile communication network 120 may include an access network 121 and a core network 122. The access network 121 is responsible for processing radio signals, terminating radio protocols, and connecting the UE 110 with the core network 122, while the core network 122 is responsible for performing mobility management, network-side authentication, and interfaces with public/external networks (e.g., the Internet).

In one embodiment, when the mobile communication network 120 is a 4G network (e.g., an LTE/LTE-A/TD-LTE network), the access network 121 may be an Evolved-Universal Terrestrial Radio Access Network (E-UTRAN) and the core network 122 may be an Evolved Packet Core (EPC). The E-UTRAN may include at least an evolved NodeB (eNB) (e.g., a macro eNB, femto eNB, or pico eNB). The EPC may include a Home Subscriber Server (HSS), a Mobility Management Entity (MME), a Serving Gateway (S-GW), and a Packet Data Network Gateway (PDN-GW or P-GW).

In one embodiment, when the mobile communication network 120 is a 5G network (e.g., an NR network), and the access network 121 and the core network 122 may be a Next Generation Radio Access Network (NG-RAN) and a Next Generation Core Network (NG-CN), respectively. The NG-RAN may include one or more gNBs. Each gNB may further include one or more Transmission Reception Points (TRPs), and each gNB or TRP may be referred to as a 5G cellular station. Some gNB functions may be distributed across different TRPs, while others may be centralized, leaving the flexibility and scope of specific deployments to fulfill the requirements for specific cases. The NG-CN may support various network functions, including an Access and Mobility Management Function (AMF), a Location Management Function (LMF), a Session Management Function (SMF), a User Plane Function (UPF), a Policy Control Function (PCF), an Application Function (AF), an Authentication Server Function (AUSF), and a Non-3GPP Inter-Working Function (N3IWF), wherein each network function may be implemented as a network element on dedicated hardware, or as a software instance running on dedicated hardware, or as a virtualized function instantiated on an appropriate platform, e.g., a cloud infrastructure.

Figure 2:
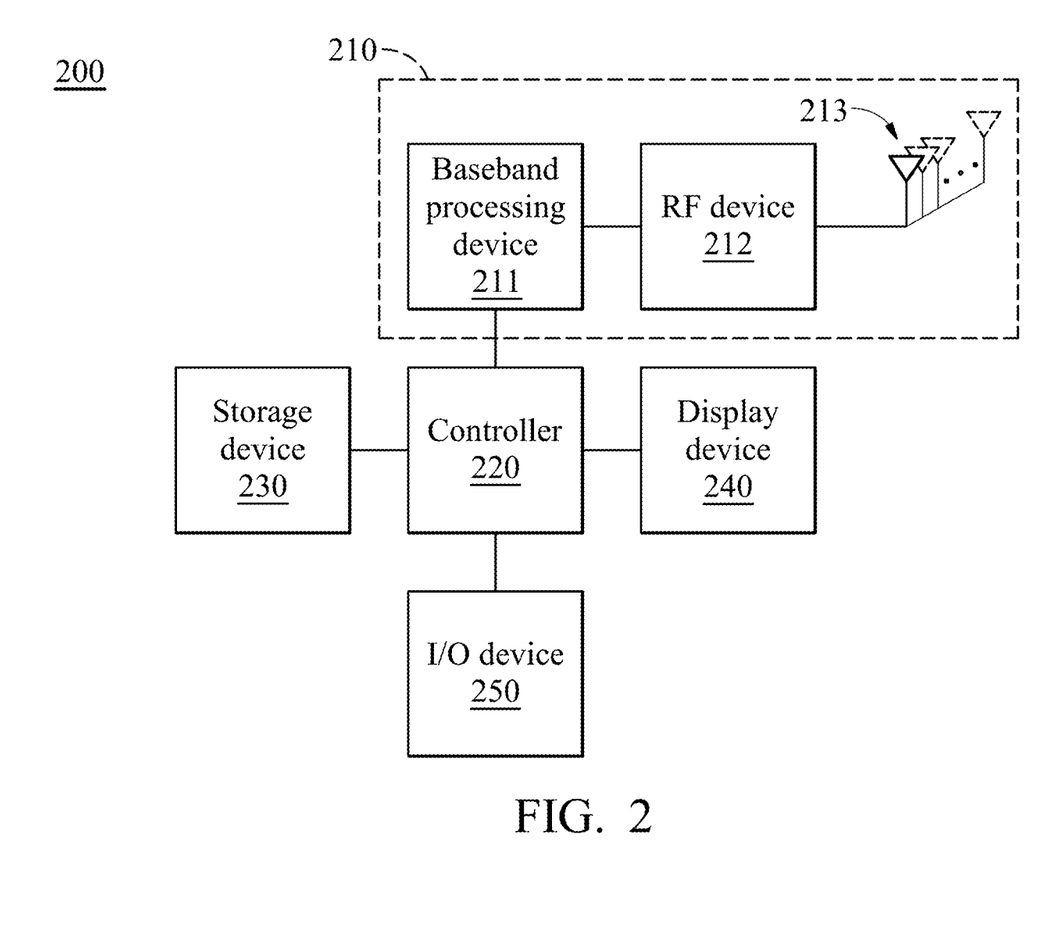
FIG. 2 is a block diagram illustrating a mobile communications device according to an embodiment of the disclosure.

FIG. 2 is a block diagram illustrating a mobile communications device 200 according to an embodiment of the disclosure, wherein the mobile communications device 200 may refer to a UE (e.g., the UE 110).

As shown in FIG. 2, the mobile communications device 200 may include a wireless transceiver 210, a controller 220, a storage device 230, a display device 240, and an Input/Output (I/O) device 250.

The wireless transceiver 210 is configured to perform wireless transmission and reception. Specifically, the wireless transceiver 210 may include a baseband processing device 211, a Radio Frequency (RF) device 212, and antenna 213, wherein the antenna 213 may include an antenna array for beamforming.

The baseband processing device 211 is configured to perform baseband signal processing. The baseband processing device 211 may contain multiple hardware components to perform the baseband signal processing, including Analog-to-Digital Conversion (ADC)/Digital-to-Analog Conversion (DAC), gain adjusting, modulation/demodulation, encoding/decoding, and so on.

The RF device 212 may receive RF wireless signals via the antenna 213, convert the received RF wireless signals to baseband signals, which are processed by the baseband processing device 211, or receive baseband signals from the baseband processing device 211 and convert the received baseband signals to RF wireless signals, which are later transmitted via the antenna 213. The RF device 212 may also contain multiple hardware devices to perform radio frequency conversion. For example, the RF device 212 may include a mixer to multiply the baseband signals with a carrier oscillated in the radio frequency of the supported cellular technologies, wherein the radio frequency may be any radio frequency (e.g., 30 GHz-300 GHz for mmWave, or 3.3 GHz-4.9 GHz for sub-6) utilized in 5G (e.g., NR) systems, or another radio frequency, depending on the RAT in use.

The controller 220 may be a general-purpose processor, a Micro Control Unit (MCU), an application processor, a Digital Signal Processor (DSP), a Graphics Processing Unit (GPU), a Holographic Processing Unit (HPU), a Neural Processing Unit (NPU), or the like, which includes various circuits for providing the functions of data processing and computing, controlling the wireless transceiver 210 for wireless communication with the mobile communication network 120, storing and retrieving data (e.g., program code) to and from the storage device 230, sending a series of frame data (e.g. representing text messages, graphics, images, etc.) to the display device 240, and receiving user inputs or outputting signals via the I/O device 250.

In particular, the controller 220 coordinates the aforementioned operations of the wireless transceiver 210, the storage device 230, the display device 240, and the I/O device 250 for performing the method of latency reduction for positioning-specific measurement reporting.

In another embodiment, the controller 220 may be incorporated into the baseband processing device 211, to serve as a baseband processor.

As will be appreciated by persons skilled in the art, the circuits of the controller 220 will typically include transistors that are configured in such a way as to control the operation of the circuits in accordance with the functions and operations described herein. As will be further appreciated, the specific structure or interconnections of the transistors will typically be determined by a compiler, such as a Register Transfer Language (RTL) compiler. RTL compilers may be operated by a processor upon scripts that closely resemble assembly language code, to compile the script into a form that is used for the layout or fabrication of the ultimate circuitry. Indeed, RTL is well known for its role and use in the facilitation of the design process of electronic and digital systems.

The storage device 230 may be a non-transitory computer-readable storage medium, including a memory (e.g., a FLASH memory or a Non-Volatile Random Access Memory (NVRAM)), a magnetic storage device (e.g., a hard disk or a magnetic tape), or an optical disc, or any combination thereof for storing data, instructions, and/or program code of applications, communication protocols, and/or the method of the present application. For example, the communication protocols may include a 4G LTE or a 5G NR protocol stack which includes a Non-Access-Stratum (NAS) layer, a Radio Resource Control (RRC) layer, a Packet Data Convergence Protocol/Radio Link Control (PDCP/RLC) layer, a Media Access Control (MAC) layer, and a Physical (PHY) layer. In one example, the method of the present disclosure may be implemented as a part of the communication protocols.

The display device 240 may be a Liquid-Crystal Display (LCD), a Light-Emitting Diode (LED) display, an Organic LED (OLED) display, or an Electronic Paper Display (EPD), etc., for providing a display function. Alternatively, the display device 40 may further include one or more touch sensors disposed thereon or thereunder for sensing touches, contacts, or approximations of objects, such as fingers or styluses.

The I/O device 250 may include one or more buttons, a keyboard, a mouse, a touch pad, a video camera, a microphone, and/or a speaker, etc., to serve as the Man-Machine Interface (MMI) for interaction with users, such as receiving user inputs, and outputting prompts to users.

It should be understood that the components described in the embodiment of FIG. 2 are for illustrative purposes only and are not intended to limit the scope of the application. For example, the mobile communications device may include more components, such as a power supply, or a Global Positioning System (GPS) device, wherein the power supply may be a mobile/replaceable battery providing power to all the other components of the mobile communications device (e.g., a UE), and the GPS device may provide the location information of the mobile communications device (e.g., a UE) for use of some location-based services or applications. Alternatively, the mobile communications device may include fewer components. For example, the mobile communications device (e.g., a UE) may not include the display device 240 and/or the I/O device 250.

Figure 3:
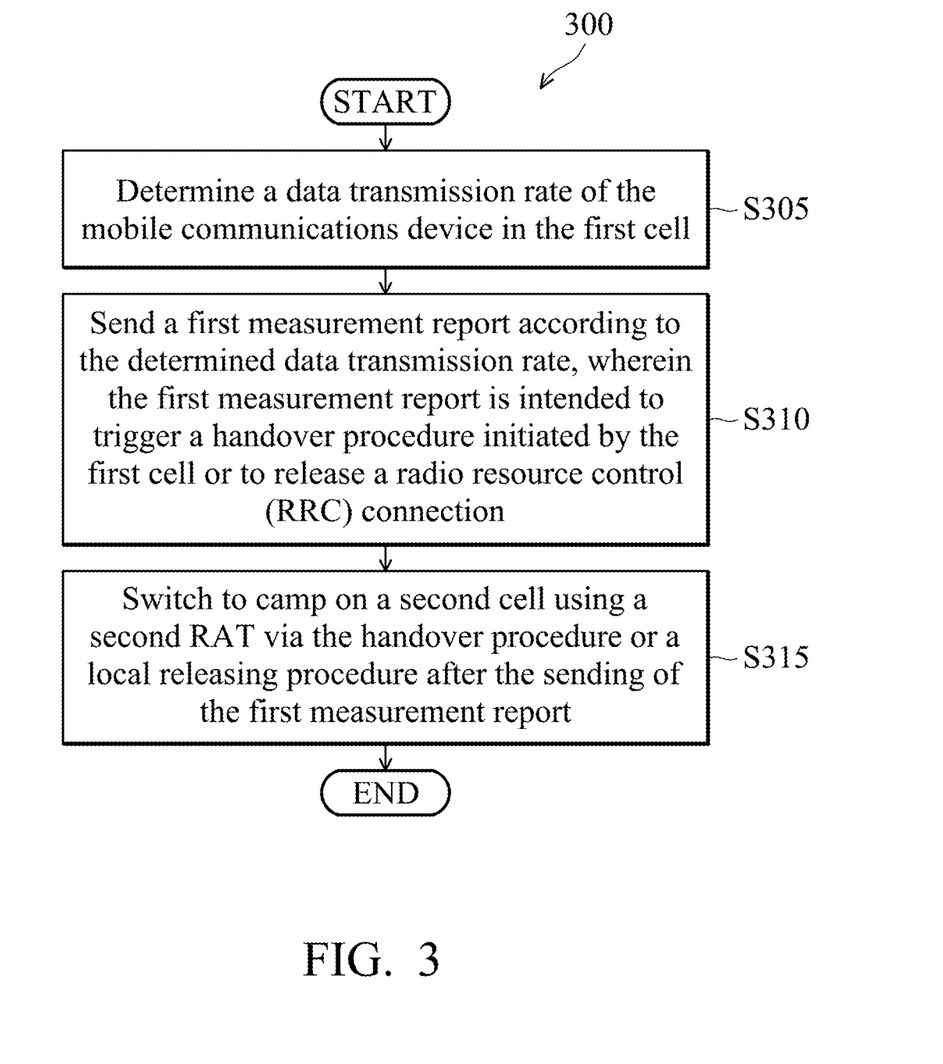
FIG. 3 is a flowchart illustrating the method for switching between different radio access technologies (RATs) according to an embodiment of the disclosure.

FIG. 3 is a flowchart 300 illustrating the method for switching between different radio access technologies (RATs) according to an embodiment of the disclosure, wherein the method is applied to and executed by a mobile communications device (e.g., the UE 110).

In step S305, the mobile communications device determines a data transmission rate of the mobile communications device in the first cell.

Then, in step S310, the mobile communications device sends a first measurement report according to the determined data transmission rate, wherein the first measurement report is intended to trigger a handover procedure initiated by the first cell or to release a radio resource control (RRC) connection.

Specifically, in cases where the first RAT is fifth generation (5G) New Radio (NR), the second RAT is fourth generation (4G) Long Term Evolution (LTE), the first measurement report is sent in response to the determined data transmission rate being lower than a first threshold. In cases where the first RAT is 4G LTE, the second RAT is 5G NR, the first measurement report is sent in response to the determined data transmission rate being higher than a second threshold. The first threshold and the second threshold are not related to each other.

In one embodiment, the first measurement report comprises a parameter indicating that a signal quality between the mobile communications device and the first cell is too poor to maintain a connection between the mobile communications device and the first cell, wherein the signal quality comprises a reference signal received power (RSRP) and a reference signal received quality (RSRQ).

In another embodiment, the first measurement report is sent when a measurement of the second cell is configured by the first cell. When the measurement is not configured by the first cell, the mobile communications device sends a second measurement report intended to trigger a measurement control procedure to measure the second cell.

In step S315, the mobile communications device switches to camp on a second cell using a second RAT by the handover procedure or a local releasing procedure after the sending of the first measurement report.

In one embodiment, in the handover procedure, the mobile communications device receives a radio resource control (RRC) connection release message sent by the first cell when releasing the RRC connection.

In another embodiment, in the local releasing procedure, the mobile communications device releases a connection between the mobile communications device and the first cell in response to the handover procedure not being triggered for a period of time after the first measurement report is sent in step S310. Specifically, in the local releasing procedure, the mobile communications device may first obtains information related to the second cell according to a public land mobile network (PLMN) list from the first cell when the handover procedure is not triggered. Then, the mobile communications device searches a second cell using the second RAT according to the PLMN list. The mobile communications device performs a local release and switches from the first cell to camp on the second cell when the second cell using the second RAT exists according to the PLMN list.

Multiple implementation manners are provided in the present disclosure. Two embodiments are used to describe the two main implementation manners of the present disclosure below. The first embodiment is an implementation in which the mobile communication device is switched from a 5G network to a 4G network. The second embodiment is an implementation in which the mobile communication device is switched from a 4G network to a 5G network. The first embodiment will be described first.

First Embodiment

Figure 4A:
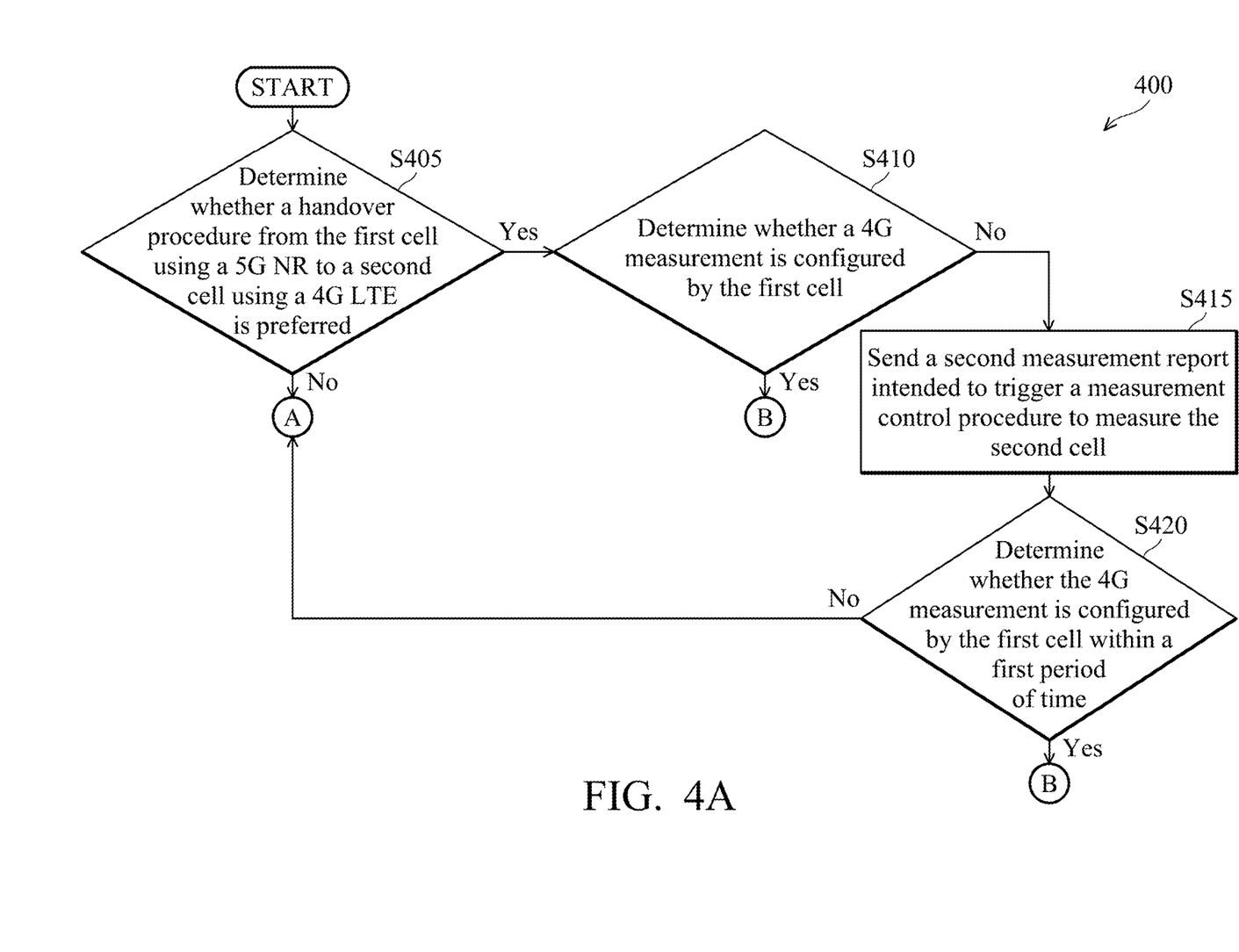
FIGS. 4A-4C are a detailed flowchart illustrating the method for switching between different radio access technologies (RATs) according to the first embodiment of the disclosure.
Figure 4B:
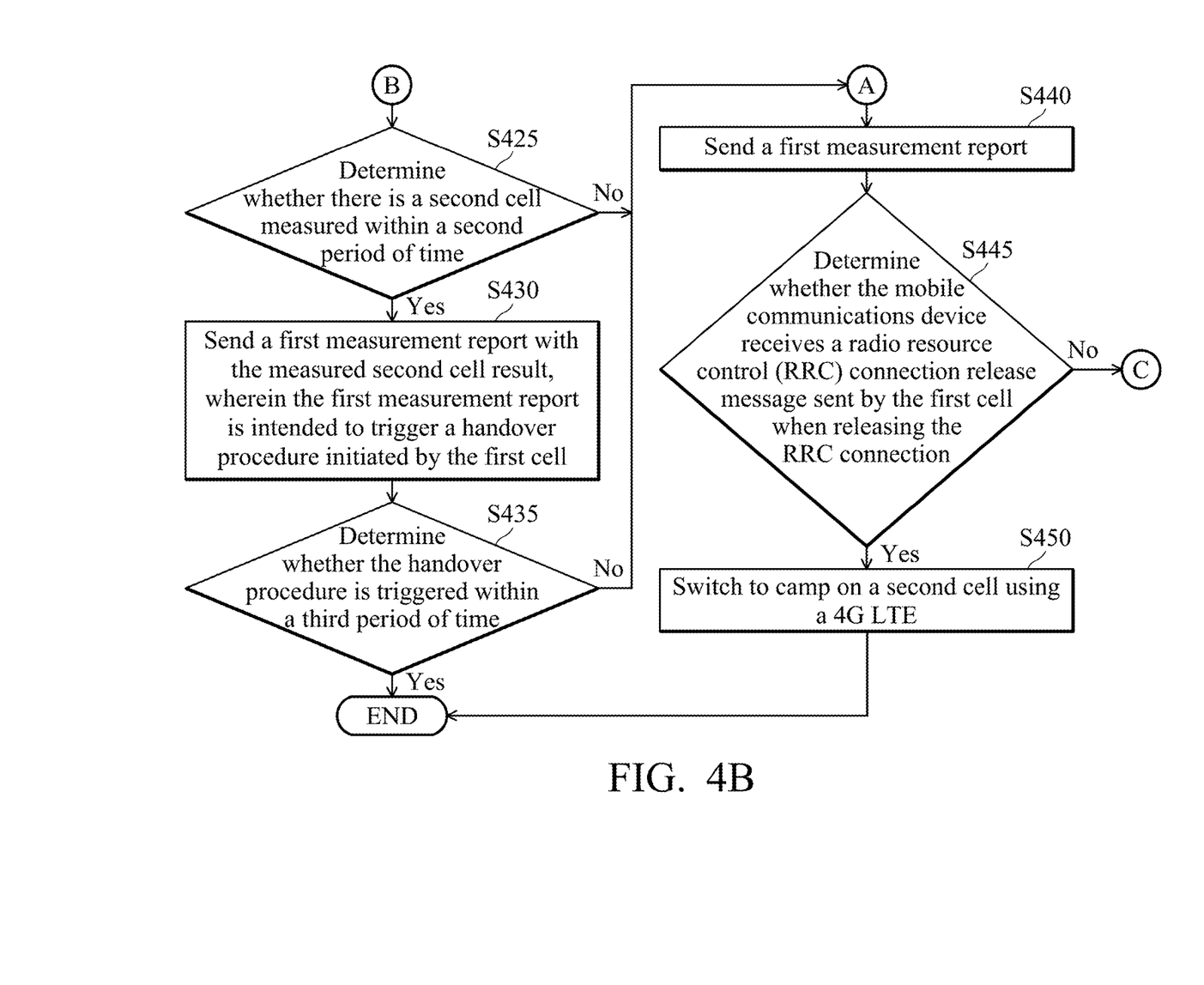
Figure 4C:
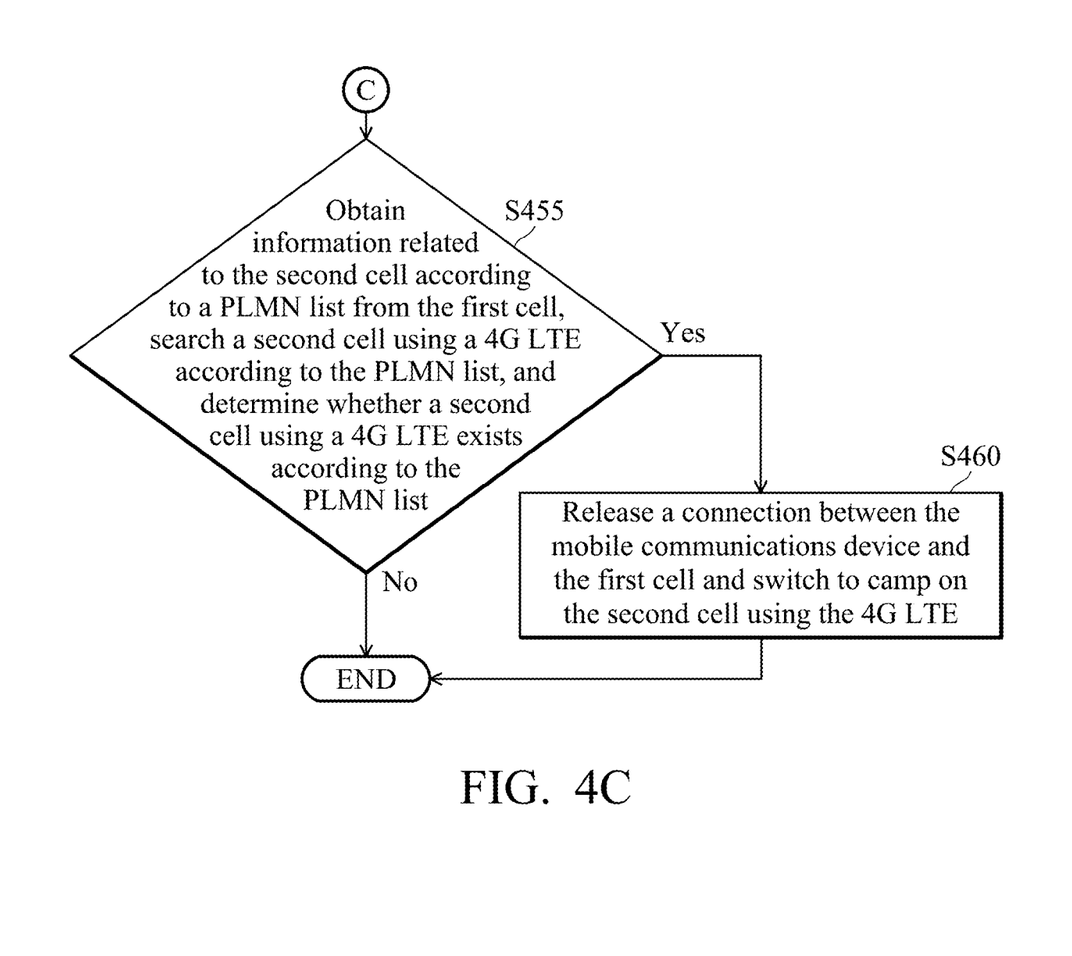

FIGS. 4A-4C are a detailed flowchart 400 illustrating the method for switching between different radio access technologies (RATs) according to the first embodiment of the disclosure, wherein the method is applied to and executed by a mobile communications device (e.g., the UE 110).

Before the start of the process, the mobile communications device camps on a first cell using a 5G NR, and a data transmission rate of the mobile communications device is determined to be lower than a threshold.

In step S405, the mobile communications device determines whether a handover procedure from the first cell using a 5G NR to a second cell using a 4G LTE is preferred. When the mobile communications device determines that a handover procedure from the first cell to the second cell is preferred ("Yes" in step S405), in step S410, the mobile communications device determines whether a 4G measurement is configured by the first cell.

When the mobile communications device determines that the 4G measurement is not configured by the first cell ("No" in step S410), in step S415, the mobile communications device sends a second measurement report intended to trigger a measurement control procedure to measure the second cell. In step S420, the mobile communications device determines whether the 4G measurement is configured by the first cell within a first period of time.

When the mobile communications device determines that the 4G measurement is configured by the first cell within a first period of time ("Yes" in step S420), in step S425, the mobile communications device determines whether there is a second cell measured within a second period of time.

When the mobile communications device determines that there is a second cell measured within a second period of time ("Yes" in step S425), in step S430, the mobile communications device sends a first measurement report with the measured second cell result, wherein the first measurement report is intended to trigger a handover procedure initiated by the first cell.

In step S435, the mobile communications device determines whether the handover procedure is triggered within a third period of time. When the mobile communications device determines that the handover procedure is triggered within the third period of time ("Yes" in step S435), the handover procedure from the first cell to the second cell has been completed and the process ends.

The method returns to step S405. When the mobile communications device determines that the handover procedure from the first cell to the second cell is not preferred ("No" in step S405), in step S440, the mobile communications device sends a first measurement report, wherein the first measurement report comprises a parameter indicating that the signal quality between the mobile communications device and the first cell is too poor to maintain the connection between the mobile communications device and the first cell. In one embodiment, the signal quality comprises a reference signal received power (RSRP) and a reference signal received quality (RSRQ).

In step S445, the mobile communications device determines whether the mobile communications device receives a radio resource control (RRC) connection release message sent by the first cell when releasing the RRC connection. When the mobile communications device determines that the mobile communications device receives the RRC connection release message sent by the first cell ("Yes" in step S445), in step S450, the mobile communications device switches to camp on a second cell using a 4G LTE and the process ends.

The method returns to step S445. When the mobile communications device determines that the mobile communications device does not receive the RRC connection release message sent by the first cell ("No" in step S445), in step S455, the mobile communications device obtains information related to the second cell according to a public land mobile network (PLMN) list from the first cell, searches a second cell using a 4G LTE according to the PLMN list, and determines whether a second cell using a 4G LTE exists according to the PLMN list.

When the mobile communications device determines that a second cell using a 4G LTE exists according to the PLMN list ("Yes" in step S455), in step S460, the mobile communications device releases the connection between the mobile communications device and the first cell, switches to camp on the second cell using the 4G LTE and the process ends. When the mobile communications device determines that a second cell using a 4G LTE does not exist according to the PLMN list ("No" in step S455), the mobile communications device still camps on the first cell using the 5G NR and the process ends.

The method returns to step S410. When the mobile communications device determines that the 4G measurement is configured by the first cell ("Yes" in step S410), the process goes to step S425. In step S425, the mobile communications device determines whether there is a second cell measured within a second period of time.

The method returns to step S420 and step S425. When the mobile communications device determines that the 4G measurement is not configured by the first cell within a first period of time ("No" in step S420) or when the mobile communications device determines that there is not a second cell measured within a second period of time ("No" in step S425), the process goes to step S440. In step S440, the mobile communications device sends the first measurement.

The method returns to step S435. When the mobile communications device determines that the handover procedure is not triggered within the third period of time ("No" in step S435), the process goes to step S440. In step S440, the mobile communications device sends the first measurement.

Second Embodiment

Figure 5A:
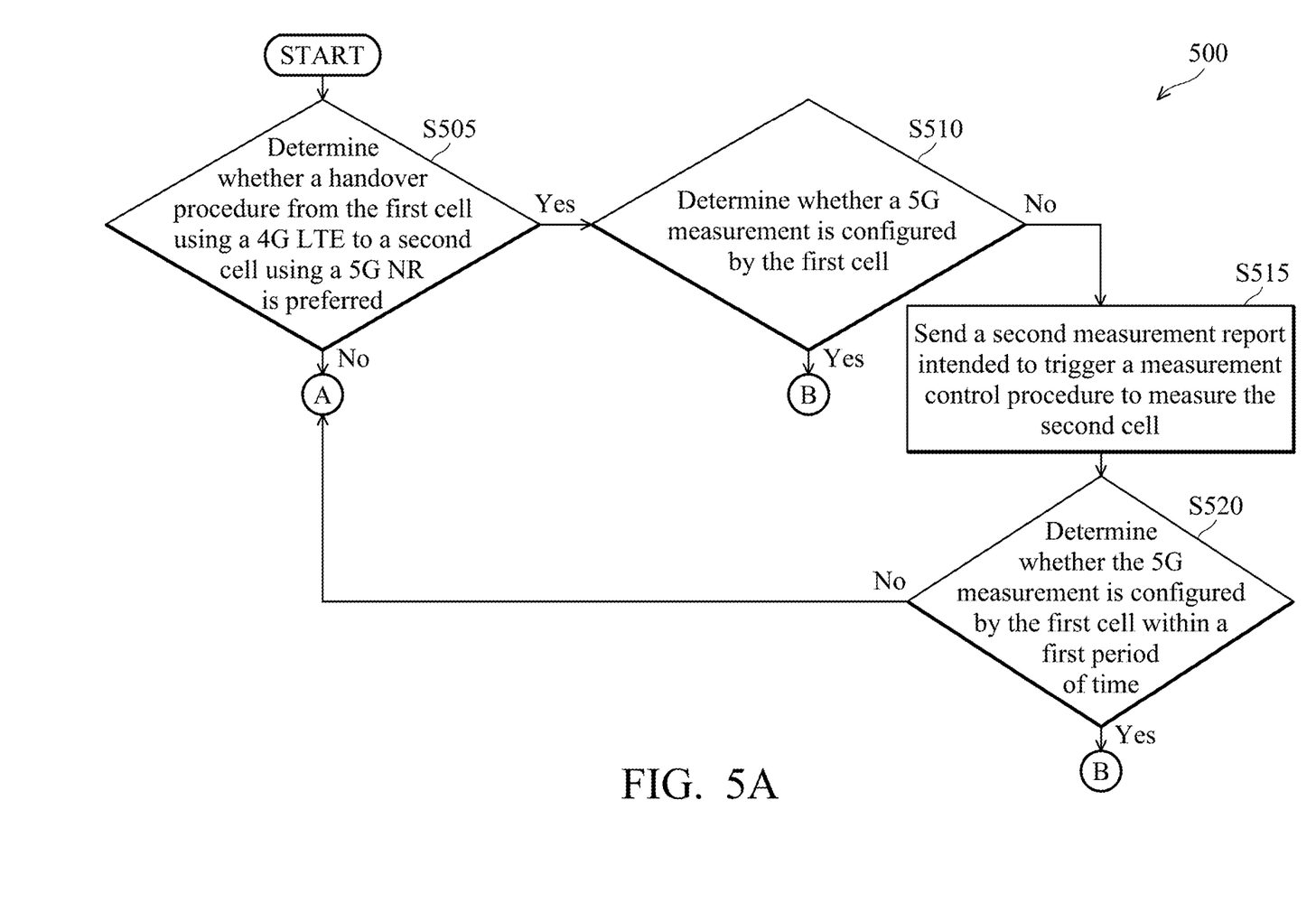
FIGS. 5A-5C are a detailed flowchart illustrating the method for switching between different radio access technologies (RATs) according to the second embodiment of the disclosure.
Figure 5B:
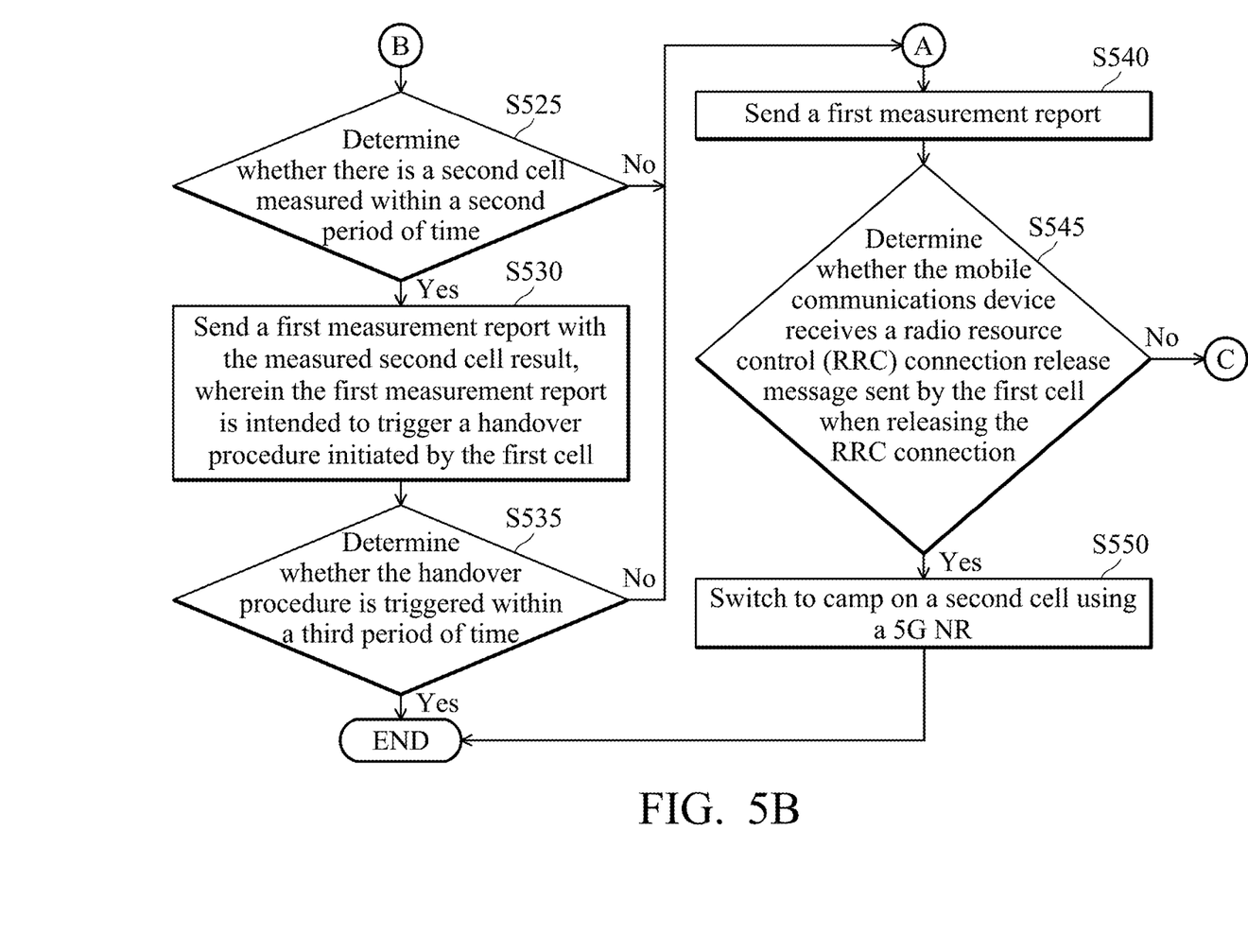
Figure 5C:
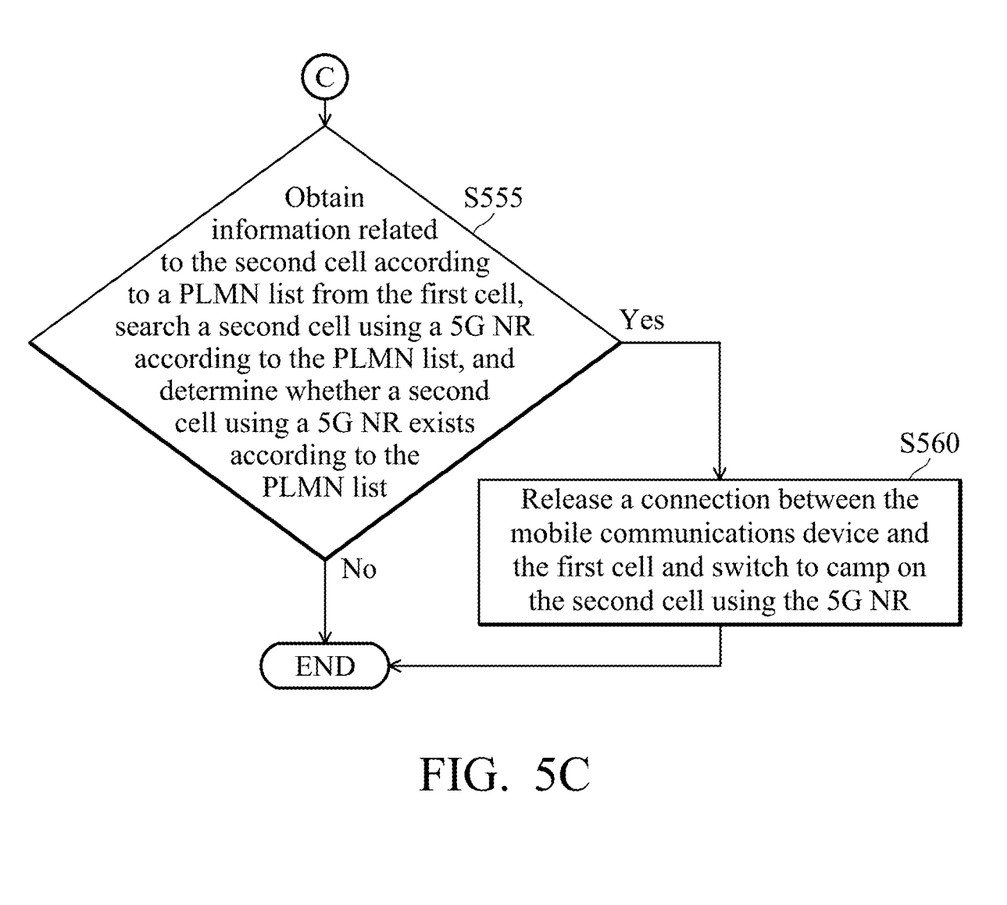

FIGS. 5A-5C are a detailed flowchart 500 illustrating the method for switching between different radio access technologies (RATs) according to the second embodiment of the disclosure, wherein the method is applied to and executed by a mobile communications device (e.g., the UE 110).

Before the start of the process, the mobile communications device camps on a first cell using a 4G LTE, and the data transmission rate of the mobile communications device is determined to be higher than a threshold.

In step S505, the mobile communications device determines whether a handover procedure from the first cell using a 4G LTE to a second cell using a 5G NR is preferred. When the mobile communications device determines that a handover procedure from the first cell to the second cell is preferred ("Yes" in step S505), in step S510, the mobile communications device determines whether a 5G measurement is configured by the first cell.

When the mobile communications device determines that the 5G measurement is not configured by the first cell ("No" in step S510), in step S515, the mobile communications device sends a second measurement report intended to trigger a measurement control procedure to measure the second cell. In step S520, the mobile communications device determines whether the 5G measurement is configured by the first cell within a first period of time.

When the mobile communications device determines that the 5G measurement is configured by the first cell within a first period of time ("Yes" in step S520), in step S525, the mobile communications device determines whether there is a second cell measured within a second period of time.

When the mobile communications device determines that there is a second cell measured within a second period of time ("Yes" in step S525), in step S530, the mobile communications device sends a first measurement report with the measured second cell result, wherein the first measurement report is intended to trigger a handover procedure initiated by the first cell.

In step S535, the mobile communications device determines whether the handover procedure is triggered within a third period of time. When the mobile communications device determines that the handover procedure is triggered within the third period of time ("Yes" in step S535), the handover procedure from the first cell to the second cell has been completed and the process ends.

The method returns to step S505. When the mobile communications device determines that the handover procedure from the first cell to the second cell is not preferred ("No" in step S505), in step S540, the mobile communications device sends a first measurement report, wherein the first measurement report comprises a parameter indicating that the signal quality between the mobile communications device and the first cell is too poor to maintain the connection between the mobile communications device and the first cell. In one embodiment, the signal quality comprises a reference signal received power (RSRP) and a reference signal received quality (RSRQ).

In step S545, the mobile communications device determines whether the mobile communications device receives a radio resource control (RRC) connection release message sent by the first cell when releasing the RRC connection. When the mobile communications device determines that the mobile communications device receives the RRC connection release message sent by the first cell ("Yes" in step S545), in step S550, the mobile communications device switches to camp on a second cell using a 5G NR and the process ends.

The method returns to step S545. When the mobile communications device determines that the mobile communications device does not receive the RRC connection release message sent by the first cell ("No" in step S545), in step S555, the mobile communications device obtains information related to the second cell according to a public land mobile network (PLMN) list from the first cell, searches a second cell using a 5G NR according to the PLMN list, and determines whether a second cell using a 5G NR exists according to the PLMN list.

When the mobile communications device determines that a second cell using a 5G NR exists according to the PLMN list ("Yes" in step S555), in step S560, the mobile communications device releases a connection between the mobile communications device and the first cell, switches to camp on the second cell using the 5G NR and the process ends. When the mobile communications device determines that a second cell using a 5G NR does not exist according to the PLMN list ("No" in step S555), the mobile communications device still camps on the first cell using the 4G LTE and the process ends.

The method returns to step S510. When the mobile communications device determines that the 5G measurement is configured by the first cell ("Yes" in step S510), the process goes to step S525. In step S525, the mobile communications device determines whether there is a second cell measured within a second period of time.

The method returns to step S520 and step S525. When the mobile communications device determines that the 5G measurement is not configured by the first cell within a first period of time ("No" in step S520) or when the mobile communications device determines that there is not a second cell measured within a second period of time ("No" in step S525), the process goes to step S540. In step S540, the mobile communications device sends the first measurement.

The method returns to step S535. When the mobile communications device determines that the handover procedure is not triggered within the third period of time ("No" in step S535), the process goes to step S540. In step S540, the mobile communications device sends the first measurement.

In view of the forgoing embodiments, it will be appreciated that the mobile communications device may adaptively switch between different RATs according to the data transmission rate of the mobile communications device. The method and device for switching between different RATs provided in the present disclosure achieves the purpose of reducing the power consumption of the mobile communications device.

It should be understood that any specific order or hierarchy of steps in any disclosed process is an example of a sample approach. Based upon design preferences, it should be understood that the specific order or hierarchy of steps in the processes may be rearranged while remaining within the scope of the present disclosure. The accompanying method claims present elements of the various steps in a sample order, and are not meant to be limited to the specific order or hierarchy presented.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the disclosure has been described by way of example and in terms of the preferred embodiments, it should be understood that the disclosure is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method, executed by a mobile communications device camping on a first cell using a first Radio Access Technology (RAT), the method comprising:
   determining, by a controller of the mobile communications device, a data transmission rate of the mobile communications device in the first cell;
   sending, by the controller, a first measurement report according to the determined data transmission rate, wherein the first measurement report is intended to trigger a handover procedure initiated by the first cell or to release a radio resource control (RRC) connection; and
   switching, by the controller, to camp on a second cell using a second RAT via the handover procedure or a local releasing procedure after the sending of the first measurement report;
   wherein when the first RAT is fifth generation (5G) New Radio (NR) and the second RAT is fourth generation (4G) Long Term Evolution (LTE), the sending of the first measurement report comprises sending the first measurement report in response to the determined data transmission rate being lower than a first threshold;
   wherein when the first RAT is 4G LTE and the second RAT is 5G NR, the sending of the first measurement report comprises sending the first measurement report in response to the determined data transmission rate being higher than a second threshold; and
   wherein the first threshold and the second threshold are not related to each other.

2. The method of claim 1, wherein the first measurement report comprises a parameter indicating that a signal quality between the mobile communications device and the first cell is too poor to maintain a connection between the mobile communications device and the first cell.

3. The method of claim 2, wherein the signal quality comprises a reference signal received power (RSRP) and a reference signal received quality (RSRQ).

4. The method of claim 1, wherein the first measurement report is sent when a measurement of the second cell is configured by the first cell.

5. The method of claim 4, further comprising:
   sending a second measurement report intended to trigger a measurement control procedure to measure the second cell when the measurement is not configured by the first cell.

6. The method of claim 4, further comprising:
   receiving a radio resource control (RRC) connection release message sent by the first cell when releasing the RRC connection.

7. The method of claim 1, wherein the local releasing procedure comprises releasing a connection between the mobile communications device and the first cell in response to the handover procedure not being triggered for a period of time after the sending of the first measurement report.

8. The method of claim 7, wherein the local releasing procedure further comprises obtaining information related to the second cell according to a public land mobile network (PLMN) list from the first cell.

9. A mobile communications device, comprising:
   a wireless transceiver, configured to perform wireless transmission and reception utilizing a first Radio Access Technology (RAT); and
   a controller, coupled to the wireless transceiver, and configured to:
   determine a data transmission rate of the mobile communications device camping on a first cell;
   send a first measurement report according to the determined data transmission rate, wherein the first measurement report is intended to trigger a handover procedure initiated by the first cell or to release a radio resource control (RRC) connection; and
   switch to camp on a second cell using a second RAT via the handover procedure or a local releasing procedure after sending the first measurement report;
   wherein when the first RAT is fifth generation (5G) New Radio (NR) and the second RAT is fourth generation (4G) Long Term Evolution (LTE), the sending of the first measurement report comprises sending the first measurement report in response to the determined data transmission rate being lower than a first threshold;
   wherein when the first RAT is 4G LTE and the second RAT is 5G NR, the sending of the first measurement report comprises sending the first measurement report in response to the determined data transmission rate being higher than a second threshold; and
   wherein the first threshold and the second threshold are not related to each other.

10. The mobile communications device of claim 9, wherein the first measurement report comprises a parameter indicating that a signal quality between the mobile communications device and the first cell is too poor to maintain a connection between the mobile communications device and the first cell.

11. The mobile communications device of claim 10, wherein the signal quality comprises a reference signal received power (RSRP) and a reference signal received quality (RSRQ).

12. The mobile communications device of claim 9, wherein the first measurement report is sent when a measurement of the second cell is configured by the first cell.

13. The mobile communications device of claim 12, wherein the controller is further configured to:
   send a second measurement report intended to trigger a measurement control procedure to measure the second cell when the measurement is not configured by the first cell.

14. The mobile communications device of claim 9, wherein the controller is further configured to:
   receive a radio resource control (RRC) connection release message sent by the first cell when releasing the RRC connection.

15. The mobile communications device of claim 9, wherein the local releasing procedure comprises releasing a connection between the mobile communications device and the first cell in response to the handover procedure not being triggered for a period of time after the sending of the first measurement report.

16. The mobile communications device of claim 15, wherein the local releasing procedure further comprises obtaining information related to the second cell according to a public land mobile network (PLMN) list from the first cell.

* * * * *